United States Patent [19]
Abe

[11] Patent Number: 5,963,382
[45] Date of Patent: Oct. 5, 1999

[54] METHODS OF RECORDING AND REPRODUCING AND APPARATUS FOR RECORDING AND REPRODUCING TIME CODES

[75] Inventor: Fumiyoshi Abe, Kanagawa, Japan

[73] Assignee: Sony Corporation, Tokyo, Japan

[21] Appl. No.: 08/586,816

[22] PCT Filed: May 31, 1995

[86] PCT No.: PCT/JP95/01054

§ 371 Date: Apr. 12, 1996

§ 102(e) Date: Apr. 12, 1996

[87] PCT Pub. No.: WO95/34071

PCT Pub. Date: Dec. 14, 1995

[30] Foreign Application Priority Data

Jun. 3, 1994 [JP] Japan ..................................... 6-122715

[51] Int. Cl.⁶ ...................................................... G11B 5/00
[52] U.S. Cl. ................................ 360/5; 360/49; 360/72.2; 386/65
[58] Field of Search .................................. 386/62, 65, 69, 386/85, 90, 91; 368/10; 360/73.11, 73.12, 5, 18, 49, 72.2

[56] References Cited

U.S. PATENT DOCUMENTS

| 5,541,781 | 7/1996 | Barr et al. .............................. 360/70 X |
| 5,646,795 | 7/1997 | Suzuki ...................................... 360/18 |

FOREIGN PATENT DOCUMENTS

| 1-243286 | 9/1989 | Japan ........................................ 360/51 |
| 1-287889 | 11/1989 | Japan ......................................... 360/5 |

*Primary Examiner*—Alan Faber
*Attorney, Agent, or Firm*—Jay H. Maioli

[57] ABSTRACT

A supplied time code is multiplied to generate detailed time data. The detailed time data are latched at a given time in an input signal. The latched time data are converted into converted time data having a given data format. The converted time data are recorded in the same transmission path as the output signal.

12 Claims, 10 Drawing Sheets

DATA OF 1 TRACK SET

TOTAL OF 144432 BYTES

FIG. 12B

| START ID 2 | START ID 1 | | START TC 2 | START TC 1 |
|---|---|---|---|---|
| 0 | | | | |
| | 0 | | | 0 |
| 0 | | | | 0 |
| | 0 | | | 0 |
| 0 | | | | 0 |
| | 0 | | | 0 |
| 0 | | | | 0 |
| | 0 | | | 0 |

FIG. 12A

| START ID 11 | START ID 10 | START ID 9 | START ID 8 | START ID 7 | START ID 6 | START ID 5 | START ID 4 | START ID 3 | START ID 2 | START TC 11 | START TC 10 | START TC 9 | START TC 8 | START TC 7 | START TC 6 | START TC 5 | START TC 4 | START TC 3 | START TC 2 |
|---|---|---|---|---|---|---|---|---|---|---|---|---|---|---|---|---|---|---|---|

FIG. 12A

| START ID 1 | | START TC 1 |
|---|---|---|
| 0 | | |
| 0 | | |
| 0 | | |
| 0 | | |
| 0 | | |
| 0 | | |
| 0 | | |
| 0 | | |

FIG. 12A

| START ID 10 | START ID 9 | START ID 8 | START ID 7 | START ID 6 | START ID 5 | START ID 4 | START ID 3 | START ID 2 | START ID 1 | START TC 10 | START TC 9 | START TC 8 | START TC 7 | START TC 6 | START TC 5 | START TC 4 | START TC 3 | START TC 2 | START TC 1 |
|---|---|---|---|---|---|---|---|---|---|---|---|---|---|---|---|---|---|---|---| ic value "1" is represented by

METHODS OF RECORDING AND REPRODUCING AND APPARATUS FOR RECORDING AND REPRODUCING TIME CODES

This is a National Stage of PCT/JP95/01054.

BACKGROUND OF THE INVENTION

1. Field of the Invention

The present invention relates to methods of recording and reproducing and apparatus for recording and reproducing time codes for use in a data recorder, for example.

2. Description of the Related Art

Data recorders, for example, are occasionally required to reproduce a time at which an optional event or the like observed in recorded data has occurred. To meet such a requirement, it has heretofore been customary for a data recorder to record time codes together with data. Time codes established by the IRIG (Inter-Range Instrumentation Group) in the USA, for example, have been used as such time codes for data recorders.

The time codes of IRIG include two types of time codes, i.e., time codes of IRIG(A) and IRIG(B). These time codes will first be described below. The main difference between the time codes of IRIG(A) and IRIG(B) lies in minimum units of the time codes. The minimum unit of the time code of IRIG(A) is [0.1 second], and the minimum unit of the time code of IRIG(B) is [1 second].

FIG. 1 of the accompanying drawings shows the time code of IRIG(A). In FIG. 1, the time code of IRIG(A) includes codes for "0.1 second", "second", "minute", "hour", and "day" which are represented by numerical values according to the binary-coded decimal notation.

As shown in a lower portion of FIG. 1, the time code of IRIG(A) is generated by modulating a carrier signal of 10 kHz. A bit clock pulse is generated every 10 cycles of the carrier signal, i.e., every 0.001 second. 100 bits constituted by such bit clock pulses constitute one set of data.

Among one set of data=100 bits, the 0th bit, the 9th bit, and those bits which are spaced from the 9th bit by successive 10 bits, i.e., the 19th bit, . . . , and the 99th bit serve as reference markers (P0~P10) each indicating a division of the time code. Each of the reference markers is composed of a greater amplitude corresponding to 8 cycles of the carrier signal and a smaller amplitude corresponding to 2 cycles of the carrier signal.

Between the reference markers, there are provided codes represented by numerical values for "0.1 second", "second", "minute", "hour", and "day". These codes are represented by numerical values according to the binary-coded decimal notation as described above. A binary value "0" is represented by a smaller amplitude corresponding to 2 cycles of the carrier signal, and a binary value "1" is represented by a greater amplitude corresponding to 5 cycles of the carrier signal. The waveform of the carrier signal of the binary value "0" is illustrated in the lower portion of FIG. 1.

The code represented by a numerical value for "second" is formed by 8 bits placed between the first reference marker P0 and the second reference marker P1. Specifically, the 8 bits are used to indicate values of "1", "2", "4", "8", "10", "20", and "40", with one bit left unassigned between "8" and "10". The numerical value for "second" of the time code is expressed by the sum of the values of those bits which have the binary value "1" represented by the waveform of the carrier signal.

Similarly, the code represented by a numerical value for "minute" is formed by 9 bits placed between the second reference marker P1 and the third reference marker P2. Specifically, the 9 bits are used to indicate values of "1", "2", "4", "8", "10", "20", and "40", with one bit left unassigned between "8" and "10". The last bit is left blank.

The code represented by a numerical value for "hour" is formed by 9 bits placed between the third reference marker P2 and the fourth reference marker P3. Specifically, the 9 bits are used to indicate values of "1", "2", "4", "8", "10", and "20", with one bit left unassigned between "8" and "10". The last two bits are left blank.

The code represented by a numerical value for "day" is formed by 9 bits placed between the fourth reference marker P3 and the fifth reference marker P4 and 2 bits following the fifth reference marker P4. Specifically, these 11 bits are used to indicate values of "1", "2", "4", "8", "10", "20", "40", "80", "100", and "200", with one bit left unassigned between "8" and "10".

The code represented by a numerical value for "0.1 second" is formed by 4 bits preceding the sixth reference marker P5. Specifically, the 4 bits are used to indicate values of "0.1", "0.2", "0.4", and "0.8". The 3rd, 4th and 5th bits from the fifth reference marker P4 are left blank.

A control function code for controlling operation of the data recorder in relation to the time code is assigned to 9×3=27 bits between the sixth reference marker P5 and the ninth reference marker P8. The control function code is optionally used by the user of the data recorder, and has no direct bearing on the present invention. Therefore, the control function code is all indicated by "0", and will not be described in detail below.

A binary code of "$2^0$", "$2^1$", "$2^2$", "$2^3$", "$2^4$", "$2^5$", "$2^6$", "$2^7$", "$2^8$", "$2^9$", "$2^{10}$", "$2^{11}$", "$2^{12}$", "$2^{13}$", "$2^{14}$", "$2^{15}$", "$2^{16}$", "$2^{17}$", which is a straight binary representation of the above seconds, minutes, hours, and days, is formed by 18 bits between the ninth reference marker P8 and the final reference marker P10. The last bit is left blank.

The above time code is generated repeatedly every 0.1 second. Each time the time code is repeated, the code represented by a numerical value for "0.1 second", which is formed by the 4 bits preceding the sixth reference marker P5, is incremented by 0.1. The time code is successively formed so as to include values carried up to "second", "minute", "hour", and "day".

In this manner, the time code of IRIG(A) is generated. A numerical value represented by this time code indicates the timing of a starting end of the first reference marker P0. The time code of IRIG(A) indicates the timing of 0.001 second with every successive bit clock pulse.

The time code shown in FIG. 1 signifies 173 days, 21 hours, 18 minutes, and 42.8 seconds. The position indicated by the arrow in FIG. 1 signifies the timing of 173 days, 21 hours, 18 minutes, and 42.875 seconds. With this time code, the cycles of the carrier signal may be used in time measurement for indicating the timing of 0.0001 second.

FIG. 2 of the accompanying drawings shows the time code of IRIG(B). In FIG. 2, the time code of IRIG(B) includes codes for "second", "minute", "hour", and "day" which are represented by numerical values according to the binary-coded decimal notation.

As shown in a lower portion of FIG. 2, the time code of IRIG(B) is generated by modulating a carrier signal of 1 kHz. A bit clock pulse is generated every 10 cycles of the carrier signal, i.e., every 0.01 second. 100 bits constituted by such bit clock pulses constitute one set of data.

Among one set of data=100 bits, the 0th bit, the 9th bit, and those bits which are spaced from the 9th bit by successive 10 bits, i.e., the 19th bit, . . . , and the 99th bit serve as reference markers (P0–P10) each indicating a division of the time code. Each of the reference markers is composed of a greater amplitude corresponding to 8 cycles of the carrier signal and a smaller amplitude corresponding to 2 cycles of the carrier signal.

In relation to the reference markers, there are provided codes represented by numerical values for "second", "minute", "hour", and "day". These codes are represented by numerical values according to the binary-coded decimal notation as described above. A binary value "0" is represented by a smaller amplitude corresponding to 2 cycles of the carrier signal, and a binary value "1" is represented by a greater amplitude corresponding to 5 cycles of the carrier signal. The waveform of the carrier signal of the binary value "0" is illustrated in the lower portion of FIG. 2.

The code represented by a numerical value for "second" is formed by 8 bits placed between the first reference marker P0 and the second reference marker P1. Specifically, the 8 bits are used to indicate values of "1", "2", "4", "8", "10", "20", and "40", with one bit left unassigned between "8", and "10". The numerical value for "second" of the time code is expressed by the sum of the values of those bits which have the binary value "1" represented by the waveform of the carrier signal.

Similarly, the code represented by a numerical value for "minute" is formed by 9 bits placed between the second reference marker P1 and the third reference marker P2. Specifically, the 9 bits are used to indicate values of "1", "2", "4", "8", "10", "20", and "40", with one bit left unassigned between "8" and "10". The last bit is left blank.

The code represented by a numerical value for "hour" is formed by 9 bits placed between the third reference marker P2 and the fourth reference marker P3. Specifically, the 9 bits are used to indicate values of "1", "2", "4", "8", "10", and "20", with one bit left unassigned between "8", and "10". The last two bits are left blank.

The code represented by a numerical value for "day" is formed by 9 bits placed between the fourth reference marker P3 and the fifth reference marker P4 and 2 bits following the fifth reference marker P4. Specifically, these 11 bits are used to indicate values of "1", "2", "4", "8", "10", "20", "40", "80", "100", and "200", with one bit left unassigned between "8" and "10". The 3rd through 9th bits from the fifth reference marker P4 are left blank.

A control function code for controlling operation of the data recorder in relation to the time code is assigned to 9×3=27 bits between the sixth reference marker P5 and the ninth reference marker P8. The control function code is optionally used by the user of the data recorder, and has no direct bearing on the present invention. Therefore, the control function code is all indicated by "0", and will not be described in detail below.

A binary code of "$2^0$", "$2^1$", "$2^2$", "$2^3$", "$2^4$", "$2^5$", "$2^6$", "$2^7$", "$2^8$", "$2^9$", "$2^{10}$", "$2^{11}$", "$2^{12}$", "$2^{13}$", "$2^{14}$", "$2^{15}$", "$2^{16}$", "$2^{17}$", which is a straight binary representation of the above seconds, minutes, hours, and days, is formed by 18 bits between the ninth reference marker P8 and the final reference marker P10. The last bit is left blank.

The above time code is generated repeatedly every 1 second. Each time the time code is repeated, the code represented by a numerical value for "second", which is formed by the 8 bits between the first reference marker P0 and the second reference marker P1, is incremented by 1. The time code is successively formed so as to include values carried up to "minute", "hour", and "day".

In this manner, the time code of IRIG(B) is generated. A numerical value represented by this time code indicates the timing of a start of the first reference marker P0. The time code of IRIG(B) indicates the timing of 0.01 second with every successive bit clock pulse.

The time code shown in FIG. 2 signifies 173 days, 21 hours, 18 minutes, and 42 seconds. The position indicated by the arrow in FIG. 2 signifies the timing of 173 days, 21 hours, 18 minutes, and 42.750 seconds. With this time code detected in an analog fashion, the cycles of the carrier signal may be used in time measurement for indicating the timing of 0.001 second.

Heretofore, the time codes of IRIG(A), IRIG(B) have been successively recorded on a single dedicated time code track assigned in a conventional so-called longitudinal multitrack data recorder. The time codes and data to be handled are simultaneously recorded and reproduced by the data recorder. With the time code of IRIG(A), it is possible to obtain time information of the data in terms of the timing of 0.0001 second. With the time code of IRIG(B), it is possible to obtain time information of the data in terms of the timing of 0.001 second.

Even if a time code recorded on a longitudinal time code track at a recording rate is reproduced at a reproducing rate different from the recording rate, the time code can be read in synchronism with the reproducing rate. Therefore, the time information relative to recorded data can be obtained even when the reproducing rate is varied. The recorded time code can effectively be utilized when data recorded over a long period of time are reproduced within a short period of time or when the time base of recorded data is expanded for a data analysis.

Data recorded with a time code may occasionally be required to be dubbed to produce a copy. When the data are recorded on multiple tracks, there are created, in a strict sense, time differences between the tracks due to the accuracy with which the head is mounted and other factors. Repeated data dubbing tends to cause the time code to suffer variations though the recorded data are not deteriorated as they are represented by digital signals.

There has been developed a data recorder having a rotary head for recording and reproducing data. Such a data recorder is highly analogous to an apparatus (VTR) for recording and reproducing a digital video signal, for example. Such data recorder with a rotary head is capable of recording a very large amount of data of up to 770 Gbits on a 19 mm-wide tape in a cassette of D-1 format, for example, which has been established by SMPTE (Society of Motion Picture and Television Engineers).

The data recorder of the type described above is also required to provide accurate times of individual data that have been recorded thereby. Apparatus for recording and reproducing video signals, for example, employ a time code prescribed by SMPTE. The time code of SMPTE is represented by encoded numerical values for hours, minutes, seconds, and frames of a video signal. The time code is recorded in relation to each frame of the video signal to help the user search for and edit desired frames.

In the apparatus for recording and reproducing video signals, the video signal has been recorded field by field, and it has been sufficient to record the time code in relation to each frame of the video signal. In the data recorder, however, the time code recorded in relation to each frame of the video signal is unable to determine correct times with sufficient accuracy.

In the case where the time codes of IRIG(A), IRIG(B) are applied to the above data recorder for recording and reproducing by the rotary head, it may be possible for the conventional data recorder to produce a longitudinal track recorded with a fixed head, for example, and record a succession of time codes on the longitudinal track. With such an arrangement, time information can be obtained in terms of each of oblique tracks recorded by the rotary head as with the SMPTE code. However, it is impossible to obtain in greater detail the time information of individual data recorded on the oblique tracks.

The above problem manifests itself particularly if the fixed head and the rotary head deviate from their proper relative positional relationship owing to an elongation or contraction of the recording medium. Specifically, when such a deviation is corrected (tracking correction), the reproduced data will be subjected to a variation corresponding to a skew in the video signal, resulting in a loss of the association between the time code recorded on the longitudinal track and the data recorded on the oblique tracks.

It has been proposed to provide areas for recording time codes in portions of oblique tracks that are recorded by the rotary head, and record the time codes in those areas with the same rotary head (transmission path) as used to record the data. According to such a proposal, the association between the time codes and the data is not lost, and it is possible to obtain correct time information of the individual data.

With the above proposal, however, the areas for recording time codes are limited to particular positions of certain tracks, for example. In order to record successive time codes, as described above, in those particular positions, a preceding time code, for example, is latched, and the latched value is recorded. As a consequence, a time code at the time associated data are recorded is not correctly recorded.

It would be possible to adjust the data rate of input data and the recording data of a data recorder to bring a particular recording position into timed relation to a time code. However, such an adjustment would be highly complex to perform. Furthermore, it would not be entirely impossible to apply this adjustment process to a so-called variable-rate data recorder which buffers input data of any optional rate and intermittently records the input data in synchronism with the recording rate inherent in the data recorder.

If the data recorder is used in combination with an apparatus which employs an existing time code, such as a time code of IRIG, then it is necessary that the time code be successively read in the same manner as with the conventional arrangement for recording the time code on the longitudinal track.

SUMMARY OF THE INVENTION

The present invention has been made in view of the above drawbacks. It is an object of the present invention to solve the problems associated with achieving strict timing conformity when a time code is recorded in a transmission path different from that of data, e.g., a multitrack or a longitudinal track with a rotary head, and when a time code cannot correctly be reproduced when the time code is recorded on the same transmission path as data.

According to the present invention, there are provided means for multiplying a supplied time code to generate detailed time data, means for latching the time data at a given time in an input signal, and means for recording the latched time data on the same transmission path as the input signal. With this arrangement, the supplied time code is multiplied to generate detailed time data, the time data are latched at a given time in the input signal, and the latched time data are recorded on the same transmission path as the input signal.

BRIEF DESCRIPTION OF THE DRAWINGS

FIGS. 12A through 12D are diagrams illustrative of another embodiment of the present invention.

DESCRIPTION OF THE PREFERRED EMBODIMENTS

Prior to a description of embodiments according to the present invention, there will be described below a so-called variable-rate data recorder to which the present invention is applied and which buffers input data (input signal) of any optional rate and intermittently records the input data in synchronism with the recording rate inherent in the data recorder.

A data recorder to which the present invention is applicable is designed according to standards (X3.175-1990) for an ID-1 format by ANSI (American National Standard Institute), for example. An overall arrangement of an apparatus which serves as such a data recorder is shown in FIG. 3.

Figure 1:
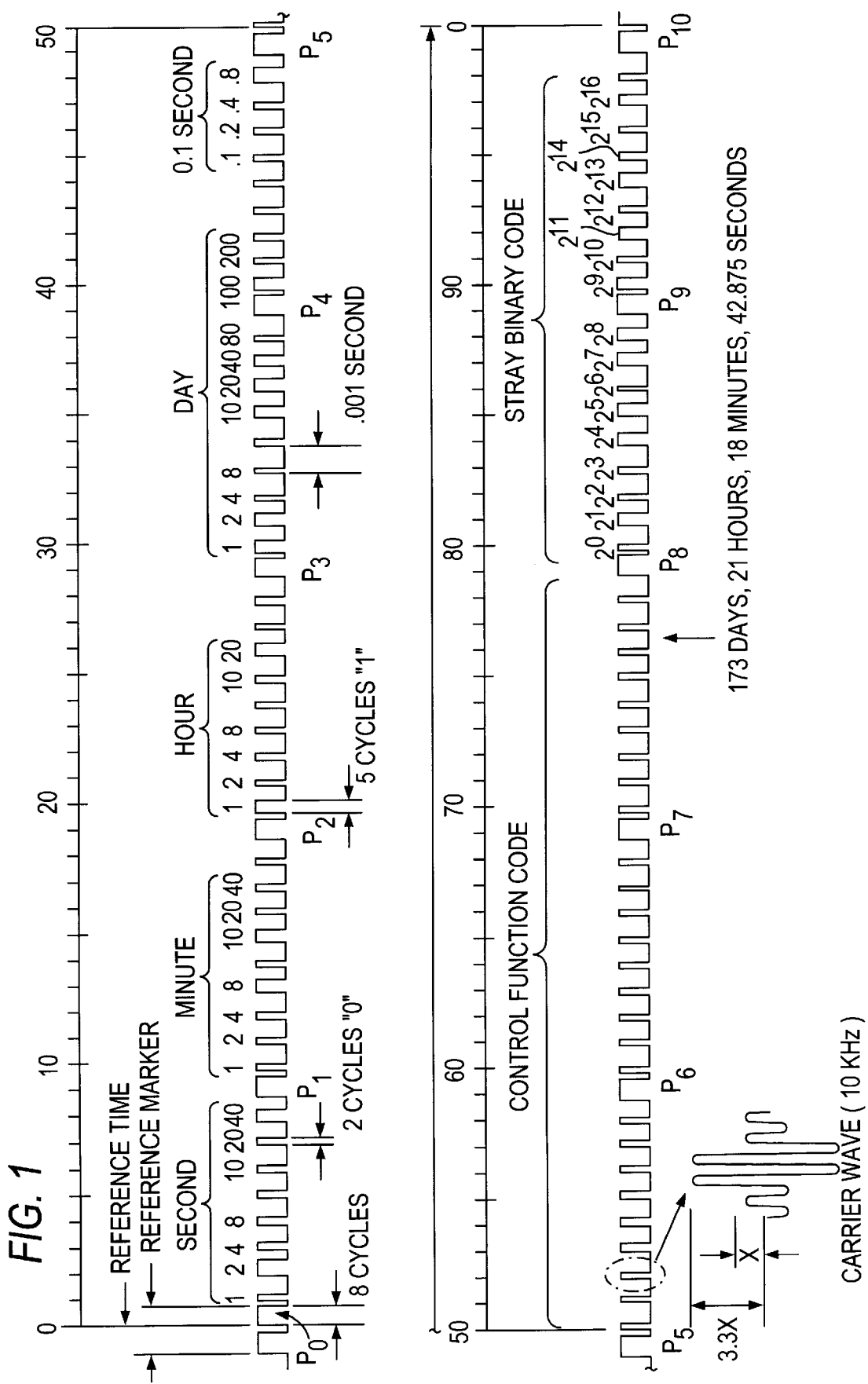
FIG. 1 is a diagram illustrative of a time code of IRIG(A)
Figure 2:
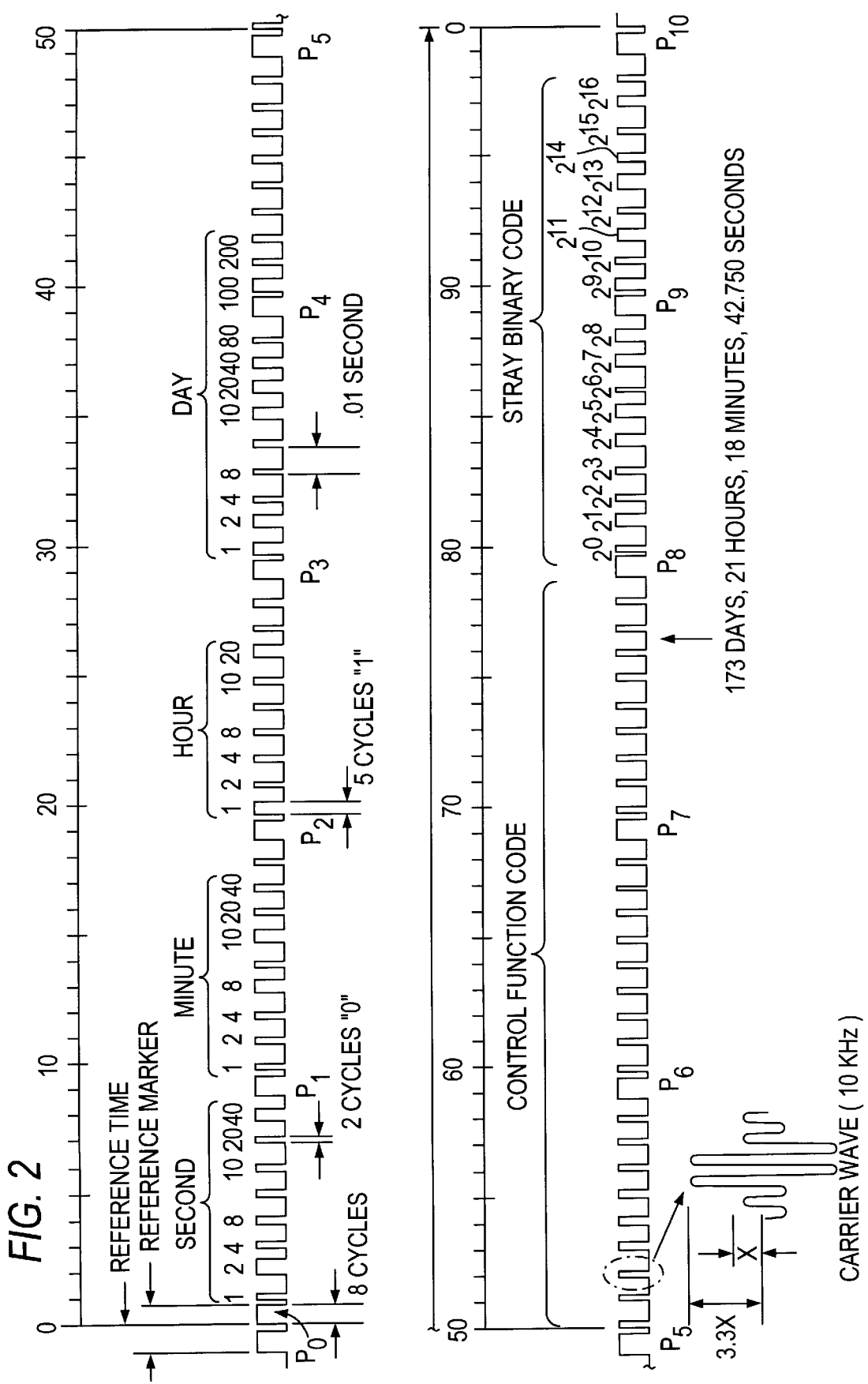
FIG. 2 is a diagram illustrative of a time code of IRIG(B)
Figure 3:
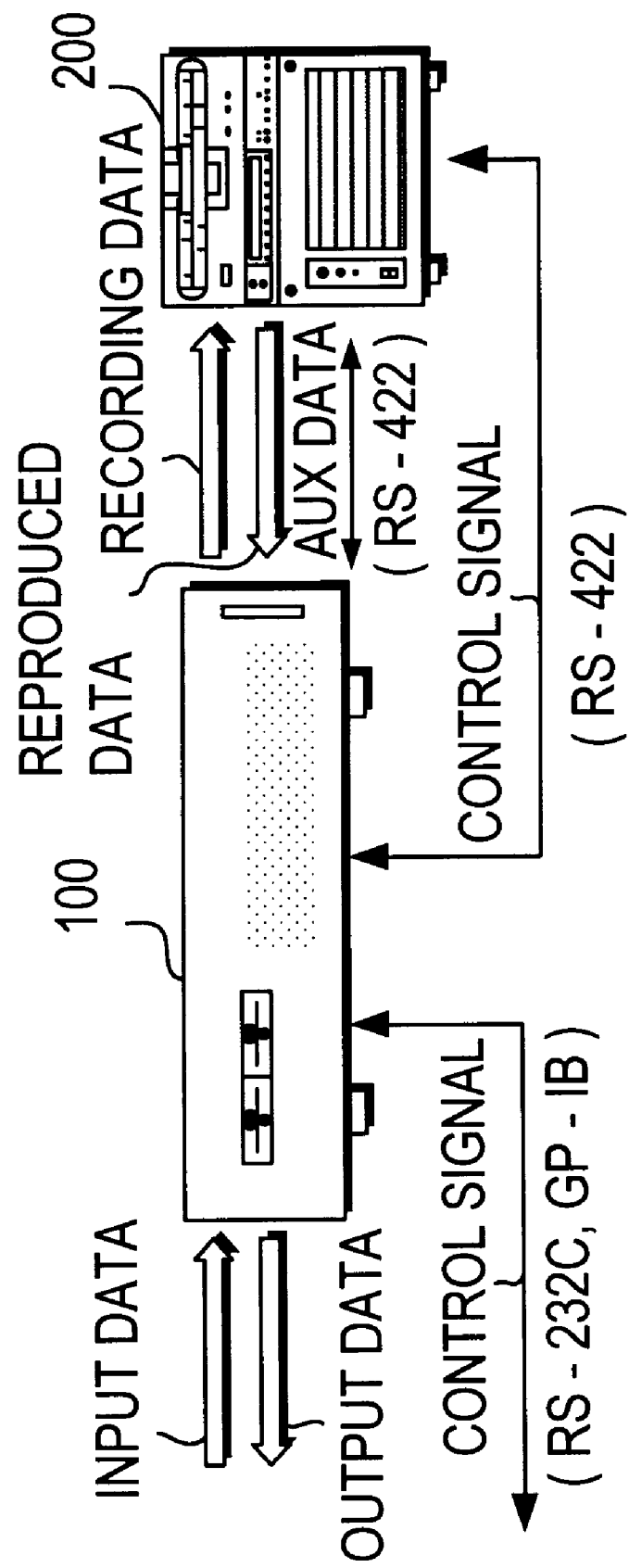
FIG. 3 is an elevational view of a data recorder to which the present invention is applied.

In FIG. 3, serial or parallel input data of any optional rate from a measuring device or the like are supplied to an interface device 100 for processing data to be recorded or reproduced by a data recorder having an inherent recording rate. In the interface device 100, the supplied input data are buffered by a memory (not shown) or the like, and the buffered data are read in synchronism with a recording rate inherent in a data recorder 200 which is substantially equivalent to a digital VTR of D-1 format, for example.

If the recording rate inherent in the data recorder 200 is high with respect to the data rate of a variable-rate input, then the data recorder 200 is switched into a recording mode when a certain amount of input data has been buffered depending on the storage capacity of the memory or the like, and the data recorder 200 is switched into a stop mode when almost all the buffered recording data have been read out. The above operation is repeated to intermittently record the input data of any optional rate in timed relationship to the recording rate inherent in the data recorder 200.

For reproduction, data reproduced from the data recorder 200 are buffered by the interface device 100, and the buffered output data are read in timed relationship to an optional rate of a data analyzer or the like to which the interface device 100 is connected. If the reproducing rate inherent in the data recorder 200 is high with respect to the data rate of a variable-rate output, then the data are intermittently reproduced from the recorder 200, buffered in a memory, and read in timed relationship to an optional rate.

To the interface device 100, there is connected a control line for exchanging a control signal such as a recording or reproducing request or information such as a data rate between itself and the measuring device, the data analyzer or the like which is connected, and also between itself and the data recorder 200. A data line for inputting and outputting accessory information (AUX data) to and from the data recorder 200 is connected between the interface device 100 and the data recorder 200. The apparatus which serves as the data recorder has the above overall arrangement.

Figure 4:
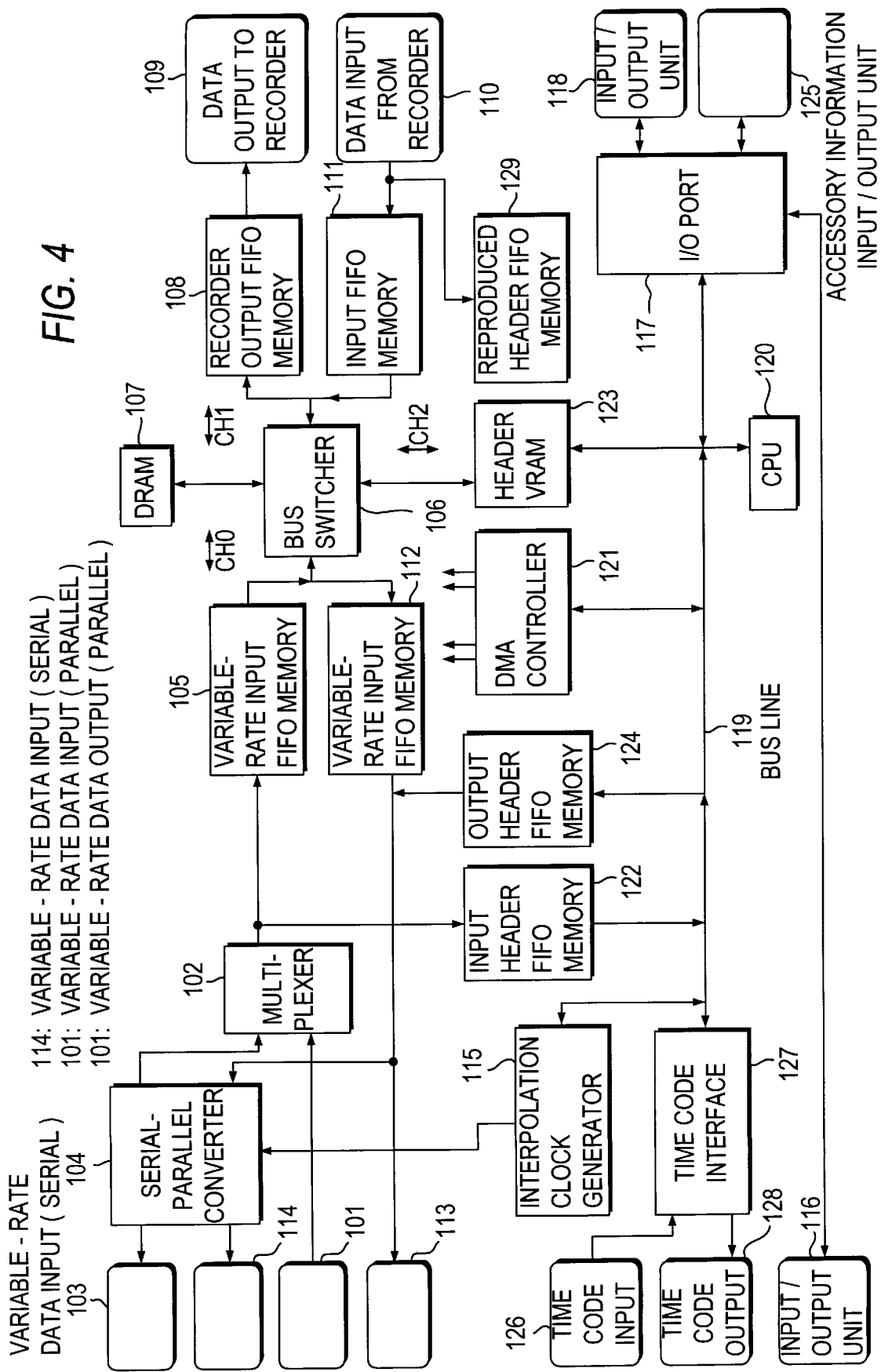
FIG. 4 is a block diagram of the data recorder to which the present invention is applied.

The interface device 100 for realizing a so-called variable-rate data recorder which intermittently records input data of any optional rate in timed relationship to a recording rate inherent in the data recorder is shown by way of example in FIG. 4.

As shown in FIG. 4, a variable-rate data input (parallel) 101 which is supplied with parallel input data of any optional rate from a measuring device (not shown), for example, is connected to a multiplexer 102 for switching between parallel and serial inputs. A variable-rate data input (serial) 103 which is supplied with serial input data of any optional rate from the measuring device, for example, is connected to the multiplexer 102 through a serial-parallel converter 104. The multiplexer 102 has an output connected to a variable-rate input FIFO memory 105 which effects timing adjustment on the input data.

The variable-rate input FIFO memory 105 has an output connected to a bus switcher 106 for switching write and read data buses of a built-in memory for buffering data. The bus switcher 106 is connected to a DRAM 107 which serves as the built-in memory. The DRAM 107 has an output connected through the bus switcher 106 to a recorder output FIFO memory 108 which effects timing adjustment on recording data. The output FIFO memory 108 has an output connected to a data output 109 for outputting recording data at an inherent rate to the data recorder 200 (not shown).

A data input 110 which is supplied with reproduced data from the data recorder 200 is connected to an input FIFO memory 111 which effects timing adjustment on the reproduced data. The input FIFO memory 111 has an output connected through the bus switcher 106 to the DRAM 107. The output of the DRAM 107 is connected through the bus switcher 106 to a variable-rate input FIFO memory 112 which effects timing adjustment on output data.

The FIFO memory 112 has an output connected to a variable-rate data output (parallel) 113 which outputs parallel output data at an optional rate to a data analyzer (not shown), for example. The output of the FIFO memory 112 is connected to the serial-parallel converter 104. The serial-parallel converter 104 is capable of converting the input data from serial to parallel form and also converting the output data from parallel to serial form. In this case, the serial-parallel converter 104 converts parallel data to serial data. The serial-parallel converter 104 has an output connected to a variable-rate data output (serial) 114 which outputs serial output data at an optional rate to the data analyzer (not shown), for example.

An output clock signal is selected depending on switching between the inputs. For selecting a desired interpolation clock signal, an interpolation clock generator 115 which generates such an interpolation clock signal is connected to the serial-parallel converter 104. To a bus line 119, there is connected a DMA controller 121 for controlling data transfer between the DRAM 107 and the FIFO memories 105, 108, 111, 112 depending on a mode.

An input/output unit (for example, RS232C/GP-IB (IEEE-488) interface) 116 for inputting and outputting control data such as data rate information from the measuring device, the data analyzer, or the like is connected to an I/O port 117 which controls the inputting and outputting of data. An input/output unit 118 for inputting and outputting control data such as operation data of the data recorder 200 is connected to the I/O port 117. The I/O port 117 is connected through the bus line 119 to a CPU 120.

To the data input 110, there is connected an input of a reproduced header FIFO memory 129 for extracting header information from reproduced data that are obtained by a reproducing operation immediately prior to the start of a recording operation, for the operation of the data recorder 200. The reproduced header FIFO memory 129 has an output connected to the bus line 119.

A time code interface 127 for achieving recording and reproduction of time codes is connected through the bus line 119 to the CPU 120. A time code input 126 and a time code output 128 are connected to the time code interface 127.

In the interface device 100, an input of an output header FIFO memory 124 is connected through the bus line 119 to the CPU 120, and an output of the output header FIFO memory 124 is connected to the output of FIFO memory 112. The output of the multiplexer 102 is connected to an input of an input header FIFO memory 122, whose output is connected through the bus line 119 to the CPU 120.

The output header FIFO memory 124 and the input header FIFO memory 122 are used to perform a copying function of the interface device 100 (a function to copy (dub) the reproduced data from the data recorder 200 on a tape in another data recorder). The copying function will be described later on.

Operation of the interface device 100 of the above structure will be described below. Prior to a description of the operation of the interface device 100, however, a recording format of the data recorder 200 connected to the interface device 100 will first be described below.

Figure 5:
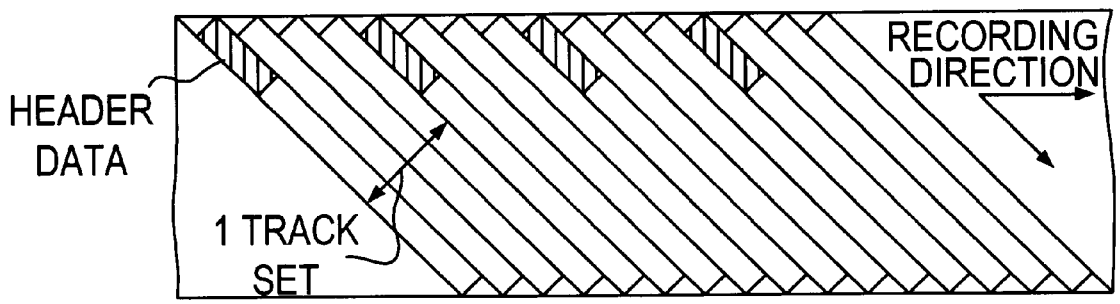
FIG. 5 is a diagram illustrative of the data recorder.

FIG. 5 shows a recording pattern produced by the data recorder 200.

The data recorder 200 records and reproduces data on one unit of four oblique tracks (referred to as a 1 track set). Header information of data recorded in a 1 track set is recorded in a hatched portion at the recording start of a first track of the 1 track set.

Figure 6:
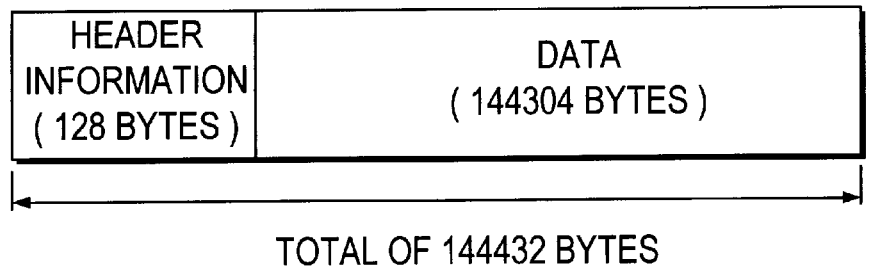
FIG. 6 is a diagram illustrative of the data recorder.

FIG. 6 shows a data structure of the 1 track set.

The data of the 1 track set are composed of the header information, described above, of 128 bytes and data of 144,304 bytes, for a total of 144,432 bytes.

Figure 7:
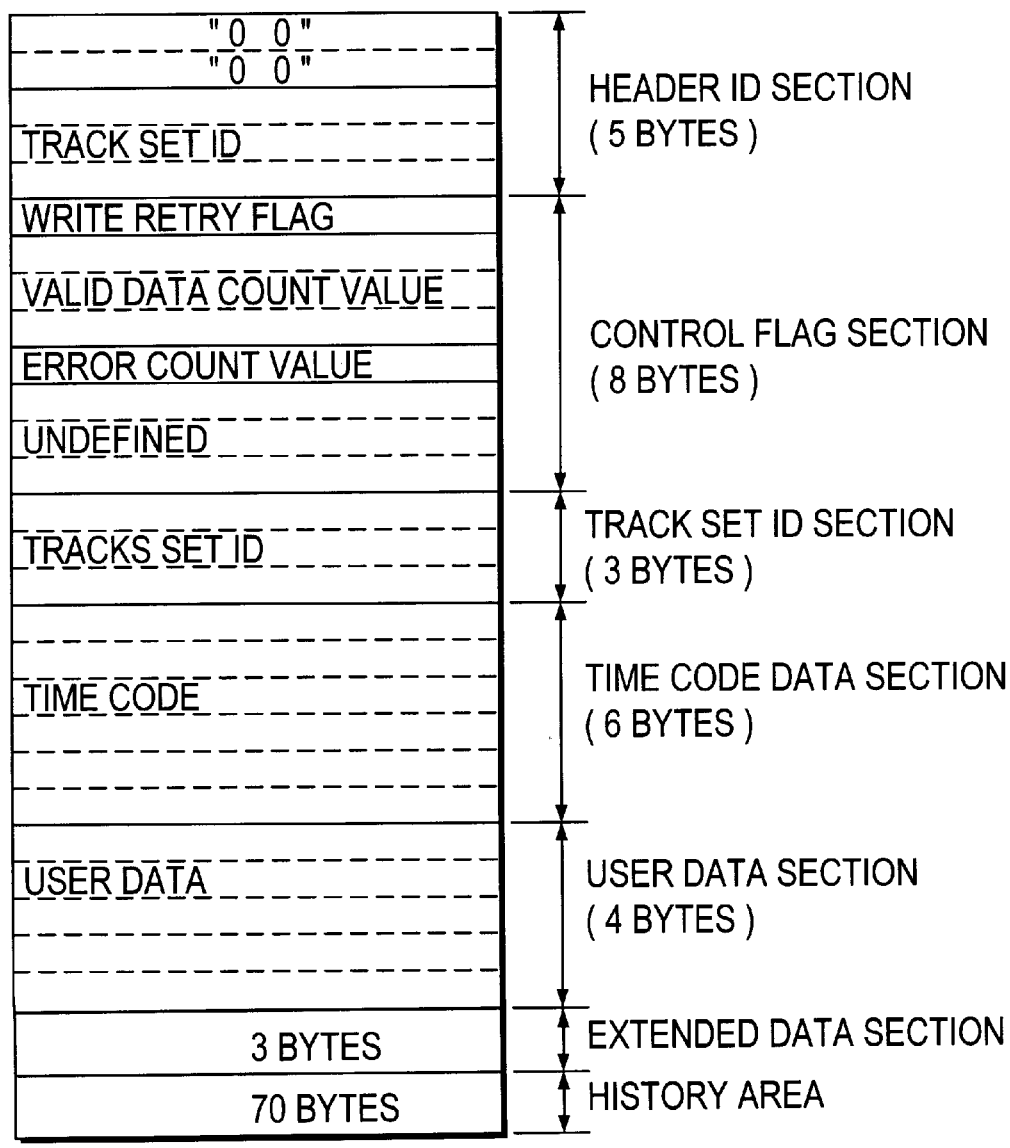
FIG. 7 is a diagram illustrative of the data recorder.

The header information of 128 bytes is constructed as shown in FIG. 7. As shown in FIG. 7, the first 5 bytes serve as a header ID section composed of 2 bytes of data "00" and ID data of 3 bytes representing the 1 track set. The next 8 bytes serve as a control flag section composed of a write/retry flag of 1 byte, an effective data count value of 3 bytes, an error count value of 1 byte, etc. The next 3 bytes serve as a track set ID section which are the same as those of the ID data representing the position information of the 1 track set on the tape.

The next 6 bytes serve as a time code data section composed of 27-bit data of seconds, minutes, hours, and days which are represented by a time code of IRIG, for example, as converted into a straight binary representation, and 21-bit fractional data (described later on). The next 4 bytes serve as a user data section related to the time code, and record a 27-bit control function code contained in a time code of IRIG, for example. The next 32 bytes serve as an extended user data section. The remaining 70 bytes serve as a history area for recording information composed of time and position information which will be used to effect a time code search, as described later on.

The operation of the interface device 100 according to the present invention will be described below with reference to FIG. 4.

Input data from the variable-rate data input (parallel) 101 or the variable-rate data input (serial) 103 which is selected by the multiplexer 102 are supplied to the variable-rate input FIFO memory 105, controlled in timing by the variable-rate input FIFO memory 105 for writing, and then written into the DRAM 107 through the bus switcher 106.

As described later on, the interface device 100 has a frequency divider for counting data clock pulses corresponding to the input data by 144,302. The timing of the input data of 144,304 bytes to be recorded in a 1 track set is detected by an output signal (data sync) from the frequency divider.

Figure 8:
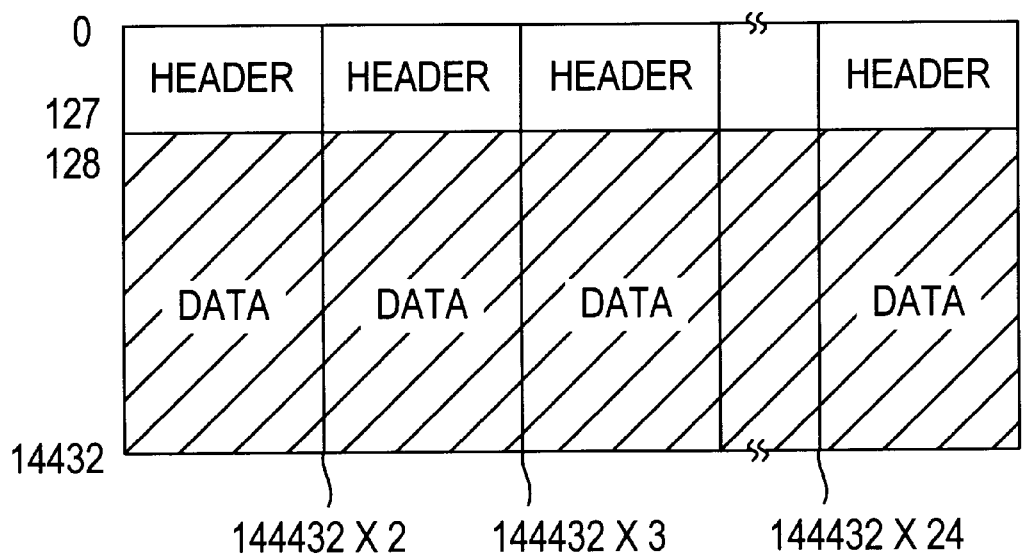
FIG. 8 is a diagram illustrative of the data recorder.

The DRAM 107 has addresses as shown in FIG. 8. Numbers on the left-hand side indicate addresses, each formed of 1 byte. Addresses 128~144,432 (corresponding to 144,304 bytes), shown hatched in FIG. 8, serve as a region for storing data, and addresses 0~127 serve as a region for storing header information.

Therefore, input data composed of every 144,304 bytes are stored in the addresses 128~144,432 of the DRAM 107.

At this time, the CPU 120 generates header information of 128 bytes depending on the data sync, referred to above. Time code data of the header information are provided as follows:

A time code of IRIG(A) or IRIG(B), described above, which has been supplied to the time code input 126 is sent to the time code interface 127.

The time code interface 127 and the CPU 120 processes the supplied time code of IRIG to generate 27-bit data which are represented by the supplied time code of IRIG as converted into a straight binary representation, and 21-bit fractional data.

The operation of the time code interface 127 will be described in detail later on with reference to FIG. 9.

The time code data generated by the time code interface 127 are read through the bus line 119 by the CPU 120, and inserted into the time code data section in the header information.

The header information thus generated by the CPU 120 is written into addresses 0~127 of the DRAM 107 through the bus line 119, a header VRAM 123, and the bus switcher 106.

The header information and the input data that have been written in the DRAM 107 are successively read out, and sent through the recorder output FIFO memory 108 to the data output 109. From the data output 109, the header information and the input data are supplied as data recorder output data compatible with the recording rate inherent in the data recorder 200 to the data recorder 200, and recorded thereby.

When the data recorder 200 is played back, reproduced data supplied to the data input 110 are delivered through the input FIFO memory 111 and the bus switcher 106 to the DRAM 107, in which the header information is written in addresses 0~127 and the data in addresses 128~144,432.

The data in the reproduced data written in the DRAM 107 are outputted through the bus switcher 106 and the variable-rate input FIFO memory 112 from the variable-rate data output (parallel) 113 or the variable-rate data output (serial) 114 at a data rate as requested by the data analyzer (not shown) or the like.

The header information written in the DRAM 107 is read through the bus switcher 106 and the header VRAM 123 by the CPU 120.

The time code data, which are composed of the 27-bit data of seconds, minutes, hours, and days which are represented by a straight binary representation, and the 21-bit fractional data, in the header information read by the CPU 120 are processed, and thereafter sent through the bus line 119 to the time code interface 127. In the time code interface 127, the original time code of IRIG is restored from the time code data, and outputted from the time code output 128 in association with the data output.

The FIFO memories 105, 108, 111, 112 are used to simultaneously write data into and read data from the DRAM 107. Specifically, to output the recording data for the data recorder 200 while input data from the measuring device (not shown), for example, are being inputted, at the same time that the input data are being written into the FIFO memory 105, the data of the DRAM 107 are written into the FIFO memory 108 at a high speed by the DRAM controller 121 so that the data remain filled at all times. Thereafter, the recording data written in the FIFO memory 108 are read at the rate inherent in the data recorder 200, and the input data written in the FIFO memory 105 are all read out and written into the DRAM 107.

To output the output data for the data analyzer (not shown) while the reproduced data from the data recorder 200 are being written, at the same time that the reproduced data are being written into the FIFO memory 111, the data of the DRAM 107 are written into the FIFO memory 112 at a high speed by the DRAM controller 121 so that the data remain filled at all times. Thereafter, the recording data written in the FIFO memory 112 are read at an optional rate, and the reproduced data written in the FIFO memory 111 are all read out and written into the DRAM 107. In this manner, it is possible to simultaneously write data into and read data from the DRAM 107.

An embodiment of methods of recording and reproducing and apparatus for recording and reproducing time codes according to the present invention will be described in detail below.

Figure 9:
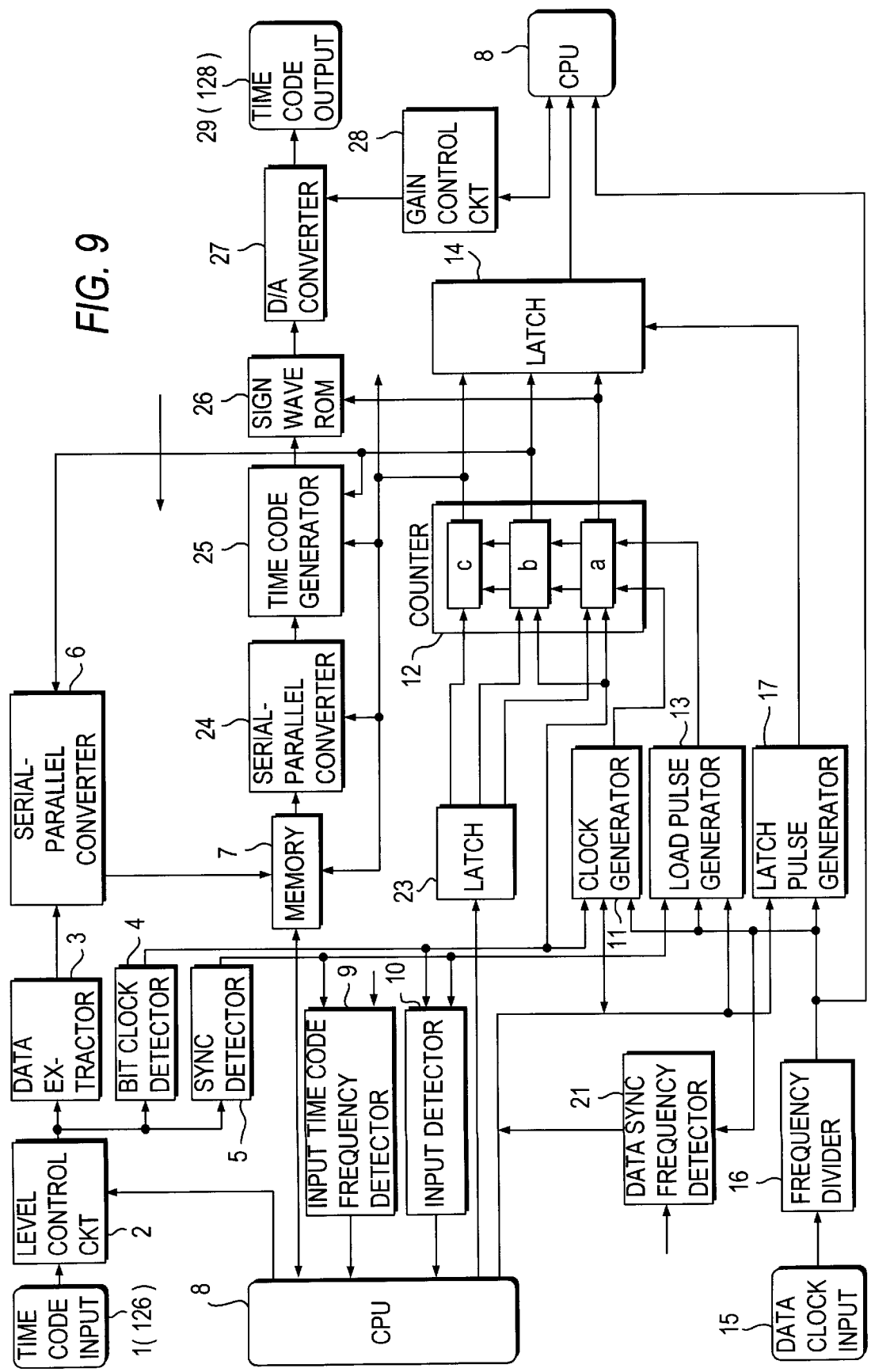
FIG. 9 is a block diagram of a system which implements methods of recording and reproducing and apparatus for recording and reproducing time codes according to the present invention.

FIG. 9 shows in detail an arrangement of the time code interface 127 shown in FIG. 4 which carries out the present invention. The arrangement shown in FIG. 9 generates time code data from a time code of IRIG and restores the time code of IRIG from the time code data, as follows:

In the generation of the time code data, the 27-bit data of seconds, minutes, hours, and days are indicated by a straight binary representation converted from:

[3-figure day data]×24×60×60
+[2-figure hour data]×60×60
+[2-figure minute data]×60
+[2-figure second data]

in the time code of IRIG supplied to the time code input 126.

In FIG. 9, for recording the time code, a signal from a time code input 1 (126) is supplied through a level control circuit 2 which adjusts the level of the signal, to a data extractor 3 which determines a smaller amplitude corresponding to 2 cycles of the carrier signal and a greater amplitude corresponding to 5 cycles thereof and extracts binary values "0" and "1". The data from the data extractor 3 are written through a serial-parallel converter 6 into a memory 7, and the data written in the memory 7 are supplied to a CPU 8, which corresponds to the CPU 120. The CPU 8 calculates the 27-bit data of seconds, minutes, hours, and days.

The CPU 8 determines 4-bit data prior to the sixth reference marker P5 in data written in the memory 7. If all the 4 bits of the 4-bit data are "0", then the CPU 8 determines that the inputted time code is a time code of IRIG(B). If the 4 bits of the 4-bit data contain a value, then the CPU 8 determines that the inputted time code is a time code of IRIG(A).

The signal from the level control circuit 2 is supplied to a bit clock detector 4 for detecting a bit clock pulse per data of "0" or "1". The bit clock detector 4 detects bit clock pulses in the time code. The signal from the level control circuit 2 is also supplied to a synchronization detector 5 for detecting when two reference markers composed respectively of a greater amplitude corresponding to 8 cycles of the carrier signal and a smaller amplitude corresponding to 2 cycles thereof are successively generated. The synchronization detector 5 detects a synchronizing signal in the time code.

The synchronizing signal detected by the synchronization detector 5 is supplied to a frequency detector 9 for detecting the frequency of the carrier signal of the inputted time code. The synchronizing signal from the synchronization detector 5 and the bit clock pulses from the bit clock detector 4 are supplied to an input detector 10 for detecting whether there is an inputted time code or not. Detected signals from the frequency detector 9 and the input detector 10 are supplied to the CPU 8, which generates a control signal for controlling the frequency and phase of a clock signal that is generated by a clock generator 11 which generates an internal operation clock signal.

Specifically, the frequency detector 9, the input detector 10, and the clock generator 11 are operated in the same manner as a phase-locked loop through the CPU 8, and are synchronized with the bit clock pulses of the inputted time code for generating a clock signal of a certain frequency which is a multiple of the frequency of the bit clock pulses. The frequency of the clock signal which is generated is 640 kHz with errors corrected if the inputted time code is a time code of IRIG(A), and 512 kHz with errors corrected if the inputted time code is a time code of IRIG(B).

The clock signal is supplied to a counter 12 which comprises a modulo-64 or -512 counter a, a modulo-10 counter b, and a counter c. The signal from the synchronization detector 5 is supplied to a load pulse selector 13 which selects load pulses when data are recorded and reproduced. The load pulse selector 13 is controlled by the control signal from the CPU 8. When data are recorded, the synchronizing signal of the time code from the synchronization detector 5 is selected, and supplied as a reset pulse to the counter 12.

When the inputted time code is a time code of IRIG(A), the counter a operates as a modulo-64 counter and directly counts clock pulses, and outputs a carry each time it counts 64 clock pulses. The carry outputted from the counter a is counted by the counter b, which outputs a carry each time it counts 10 carries from the counter a. The carry outputted from the counter b is counted by the counter c. The counters a, b are reset by the signal from the bit clock detector 4.

The counter c counts a frequency-divided clock signal of 1 kHz, and outputs 7-bit numerical values in the positions of 0.01 second and 0.001 second. The counter b counts a frequency-divided clock signal of 10 kHz, and outputs a 4-bit numerical value in the position of 0.0001 second. The counter a counts a value representing the time when the frequency-divided clock signal of 10 kHz (which is the same as the carrier signal) is divided into 64 equal portions, and outputs a 6-bit value indicating that time.

When the inputted time code is a time code of IRIG(B), the counter a operates as a modulo-512 counter and directly counts clock pulses, and outputs a carry each time it counts 512 clock pulses. The carry outputted from the counter a is counted by the counter b, which outputs a carry each time it counts 10 carries from the counter a. The carry outputted from the counter b is counted by the counter c. The counters a and b are reset by the signal from the bit clock detector 4.

The counter c counts a frequency-divided clock signal of 0.1 kHz, and outputs 7-bit numerical values in the positions of 0.1 second and 0.01 second. The counter b counts a frequency-divided clock signal of 1 kHz, and outputs a 4-bit numerical value in the position of 0.001 second. The counter a counts a value representing the time when the frequency-divided clock signal of 1 kHz (which is the same as the carrier signal) is divided into 512 equal portions, and outputs a 10-bit value indicating that time.

The count from the counter 12 is supplied to a latch 14 for latching data according to a latch pulse, described later. A signal corresponding to a signal which is produced when the frequency of the bit clock pulses of the inputted time code is divided by 100 is outputted as the carrier output from the counter b, and supplied as a shift clock signal to the serial-parallel converter 6.

The clock signal of the data (input signal) from the measuring device (not shown) is supplied to a data clock input 15. The clock signal from the data clock input 15 is supplied to a frequency divider 16, which divides the frequency of the clock signal into a $\frac{1}{144,304}$ frequency. Therefore, the frequency divider 16 outputs a frequency-divided signal (referred to as a data sync signal) each time it counts 144,304 data clock pulses, and the data sync signal is supplied through a latch pulse generator 17 to the latch 14.

The latch 14 latches the count from the counter 12 in timed relationship to data next to the data (input data) supplied from the measuring device (not shown) and composed of 144,304 bytes recorded in a 1 track set, and latches a fractional value of the time code at the time of the first data recorded in the 1 track set.

The value latched by the latch 14 is supplied to the CPU 8, and the data sync signal from the frequency divider 16 is supplied to the CPU 8. The value supplied to the CPU 8 is converted into a straight binary value, generating 21-bit fractional data in the time code data.

When the inputted time code is a time code of IRIG(A), the 21-bit fractional data in the time code data are of a straight binary representation converted from:

([data of 0.1 second of the time code of IRIG]/10

+[value of the counter c]/10/100

+[value of the counter b]/10/100/10

+[value of the counter a]/10/100/10/64)

×2097152 (=$2^{21}$).

When the inputted time code is a time code of IRIG(B), the 21-bit fractional data in the time code data are of a straight binary representation converted from:

([value of the counter c]/100

+[value of the counter b]/100/10

+[value of the counter a]/100/10/512)

×2097152.

In this manner, the 27-bit data of seconds, minutes, hours, and days, and the 21-bit fractional data in the time code data are generated, and the time code data in the header information are generated using those data.

In the methods of recording and reproducing and apparatus for recording and reproducing time codes according to the present invention, the supplied time code is multiplied to generate detailed time data, the time data are latched at a given time in the input signal, the latched time data are converted into a given data format, and the converted time data are recorded in the same transmission path as the input signal. In this manner, the correct time data can be recorded in the same transmission path as the input signal, and the time of recorded individual data can accurately be determined.

The time code is recorded per data of 1 track set supplied from the measuring device, for example, and recorded per given amount of supplied data irrespective of the rate of the supplied data. Therefore, the above detailed time code can be recorded by a data recorder having any optional variable rate.

For reproducing the detailed time code that has been recorded, a reproducing data clock signal from the data analyzer (not shown) is supplied to the data clock input 15. The data clock signal from the data clock input 15 is supplied to the frequency divider 16, which divides the frequency of the data clock signal into a $1/144,304$ frequency to generate a data sync signal per 1 track set. The data sync signal is then supplied to a frequency detector 21 for detecting a data sync signal frequency.

A detected signal from the frequency detector 21 is supplied to the CPU 8. The CPU 8 calculates time intervals upon recording between data sync signals from the reproduced time code, and calculates a time ratio between the data sync signals at the time when they are recorded and reproduced. The time ratio is supplied to the clock generator 11, which generates a reproduction clock signal as corrected by a ratio between recording and reproducing speeds.

The fractional value in the reproduced time code is inversely converted into the values of the counters a, b, c by the CPU 8, and they are latched by a latch 23. The latched values are then supplied to load terminals of the counter 12. The data sync signal from the frequency divider 16 is supplied to the load pulse selector 13. For reproduction, the supplied data sync signal is selected, and supplied as load pulses to the counter 12. After the fractional value of the reproduced time code is loaded, the counter 12 counts the reproduced clock signal.

The 27-bit values of seconds, minutes, hours, and days in the reproduced time code are inversely converted into data representing [3-figure days], [2-figure hours], [2-figure minutes], [2-figure seconds], and [0.1 second] of IRIG(A), for example, by the CPU 8, and the converted data are supplied to the memory 7. The data stored in the memory 7 are then supplied through a parallel-serial converter 24 to a time code generator 25 for generating the time code of IRIG(A).

A time code generated by the time code generator 25 is supplied to a ROM 26 in which generated data of sine wave are written, and the ROM 26 is supplied with the value of the counter a from the counter 12. The generated time code is thus converted into a time code represented by a carrier signal of sign wave as amplitude-modulated which has been established by the IRIG.

In the ROM 26, there are written generated data corresponding to the levels at times when one period of a sign wave, for example, is divided into 64 equal portions. If the time code is a time code of IRIG(A), then the generated data are read according to the value of the counter a from the counter 12. If the time code is a time code of IRIG(B), then the generated data are read according to a high-order 6-bit value of the counter a. The generated data represent data of greater amplitudes, smaller amplitudes, and transitional conditions upon switching between the greater and smaller amplitudes. Necessary data are read out according to the time code from the time code generator 25.

The ROM 26 produces a signal of the generated time code represented by a carrier signal of sign wave as amplitude-modulated which has been established by the IRIG. This signal is supplied to a D/A converter 27, and the signal from the CPU 8 is also supplied to the D/A converter 27 through a gain control circuit 28 for varying the output level. The D/A converter 27 supplies a converted signal to a time code output 29 (128).

In the methods of recording and reproducing and apparatus for recording and reproducing time codes according to the present invention, the differences between successively reproduced time data and reproduced time intervals are measured, a reproduced clock signal is controlled based on the ratio between the measured differences and time intervals, the time data are preset in the counter, and the controlled reproduced clock signal is supplied to the counter to produce the count of the counter as a reproduced time code. In this manner, time codes representing times at which an input signal is recorded at an optional rate can successively be reproduced.

According to the present invention, furthermore, a portion of the detailed time data includes information having a generatable resolution of a prescribed carrier signal of the supplied time code, the information representing divisions of the carrier signal, so that the time code can be reproduced with high accuracy.

More specifically, in the methods of recording and reproducing and apparatus for recording and reproducing time codes according to the present invention, successively generated time codes are intermittently recorded at optional times in timed relationship to the data, and the recorded time codes are successively reproduced. In this manner, the recorded times can accurately be obtained, and correct recorded times can be reproduced with respect to any optional recording rate. Correct recorded times with respect to data between intermittently recorded time codes can also be obtained.

By controlling reproduced clock signals of the reproduced time codes depending on the ratio between the differences between successively reproduced time data and reproduced time intervals, time codes are produced in synchronism with a reproducing speed even if the reproducing speed is different from a recording speed. These time codes can be utilized when data recorded over a long period of time are reproduced in a short period of time or when the time base of recorded data is expanded for a data analysis.

In the methods of recording and reproducing and apparatus for recording and reproducing time codes according to the present invention, furthermore, time codes can effectively utilized in a so-called variable-rate data recorder which intermittently records input data of any optional rate at a recording rate inherent in the data recorder.

Specifically, the variable-rate data recorder buffers input data of any optional rate and intermittently records the input data in synchronism with the recording rate inherent in the data recorder. Therefore, the time at which the data are recorded in the data recorder does not correspond to the time at which the input data are inputted. According to the conventional process by which time codes are recorded at the same time input data are recorded, the time codes cannot accurately be recorded.

In the methods of recording and reproducing and apparatus for recording and reproducing time codes according to the present invention, a time code representing the time when first input data of each track set are inputted is recorded in detail in header information of the track set, and successive time codes are generated by multiplying the time code of each track set. In this fashion, correct time codes can be recorded and reproduced by the data recorder which intermittently records the data.

Figure 10A:
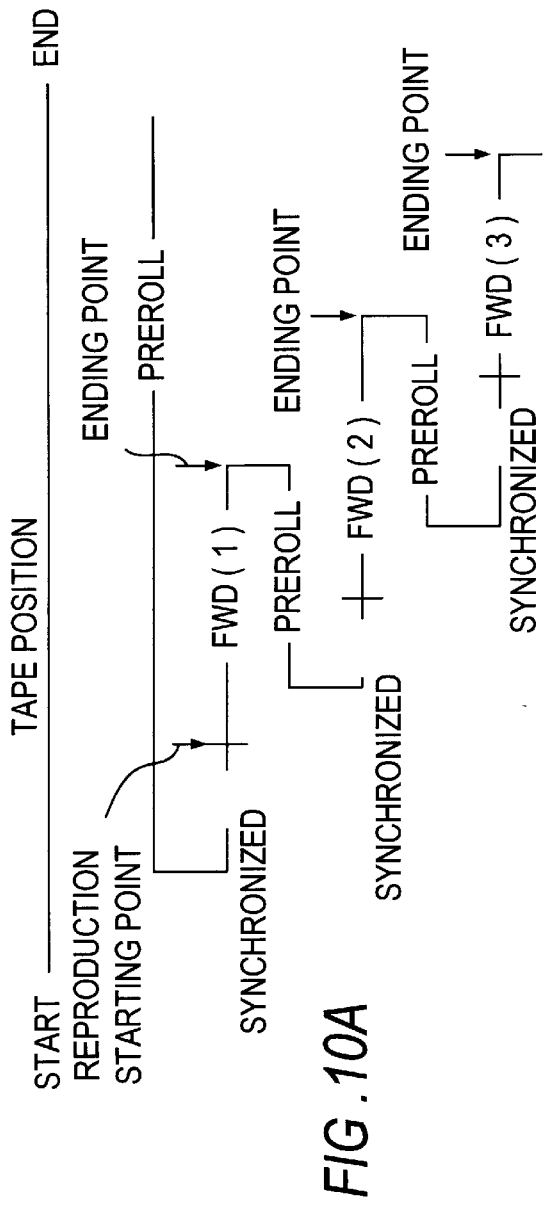
FIGS. 10A and 10B are diagrams showing operation of the data recorder to which the present invention is applied.
Figure 10B:
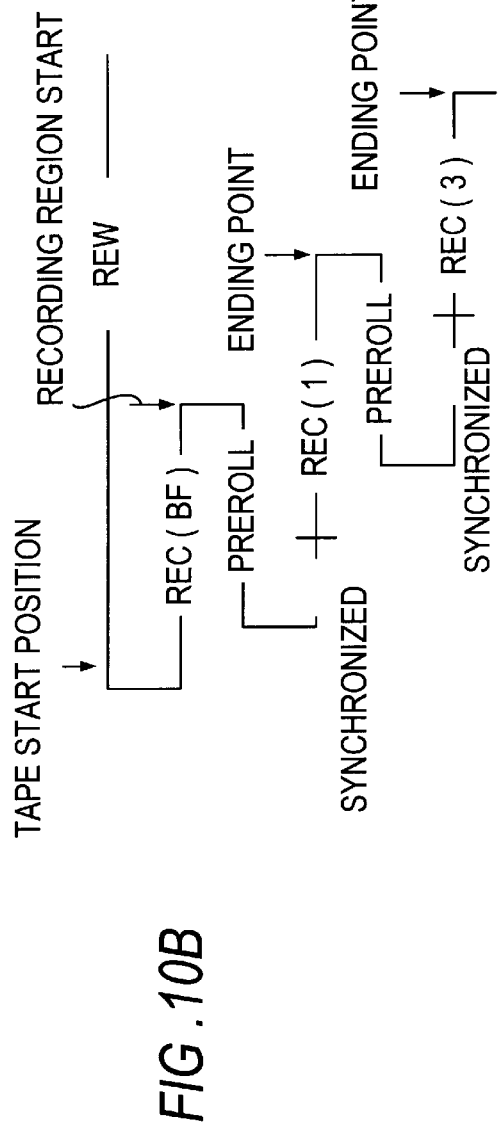

In the methods of recording and reproducing and apparatus for recording and reproducing time codes according to the present invention, data are normally recorded and reproduced by the data recorder 200 as shown in FIGS. 10A and 10B, for example. In FIGS. 10A and 10B, the left-hand size indicates a start of the tape, and the right-hand side indicates an end of the tape.

FIG. 10A is illustrative of operation of the data recorder 200 when it reproduces data. In FIG. 10A, a desired reproduction starting point is searched for in a preroll mode. When the reproduction starting point is detected, synchronizing operation is started from a point where the preroll mode has been effected, and a first reproduction mode (FWD1) is carried out from the reproduction starting point. When the first reproduction mode (FWD1) is finished, the data recorder 200 enters a stop mode. Thereafter, synchronizing operation is resumed from a point where a preroll mode has been effected, and a second reproduction mode (FWD2) is carried out from a point where the first reproduction mode (FWD1) is finished. The above process is repeated to reproduce data in a third reproduction mode (FWD3) and so on.

FIG. 10B is illustrative of operation of the data recorder 200 when it records data. In FIG. 10B, when the start or beginning of the tape (BOT) is detected in a rewinding (REW) mode, a given tape start format (REC-FB) is first recorded. When a start of a data recording region is detected, the data recorder 200 enters a stop mode. Thereafter, a synchronizing operation is resumed from a point where a preroll mode has been effected, and a first recording mode (REC1) is carried out from the start of the data recording region. When the first recording mode (REC1) is finished, the data recorder 200 enters a stop mode. Thereafter, the synchronizing operation is resumed from a point where a preroll mode has been effected, and a second recording mode (REC2) is carried out from a point where the first recording mode (REC1) is finished. The above process is repeated to reproduce data in a third reproduction mode (REC3) and so on.

In this manner, the data recorder 200 effects normal recording and reproducing operations. Since the data recorder 200 intermittently operates as described above, it can smooth record and reproduce data which have been intermittently processed by a host computer or which have any optional variable rate different from the recording rate of the data recorder.

Figure 11:
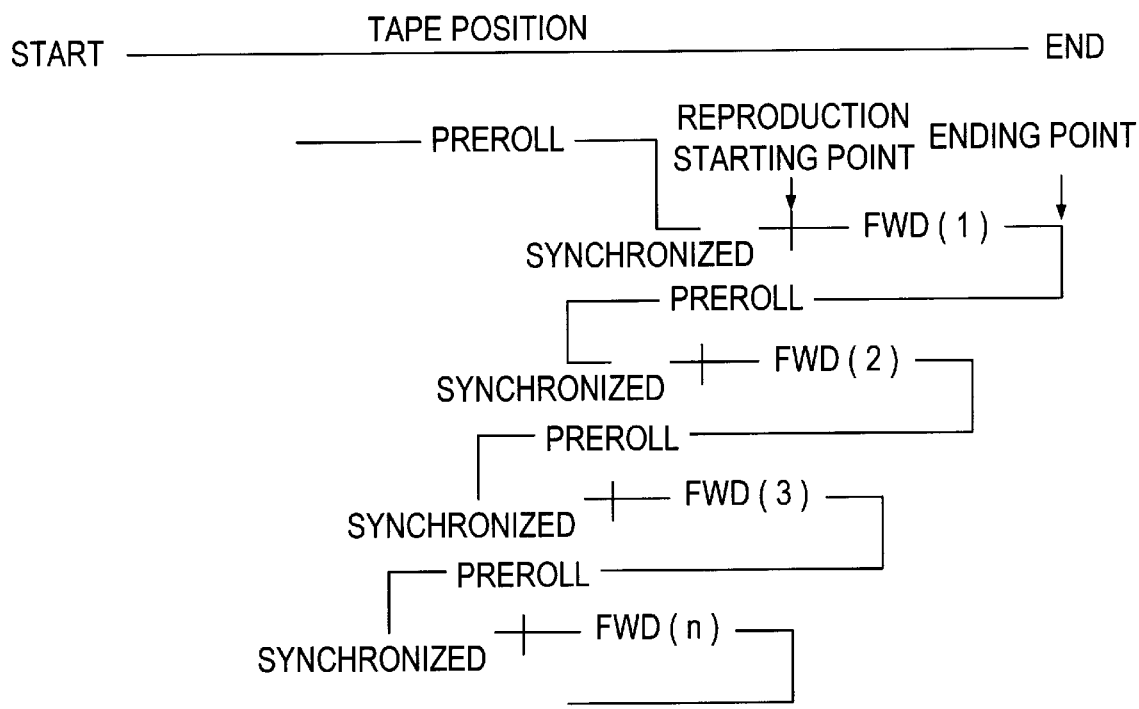
FIG. 11 is a diagram showing operation of the data recorder to which the present invention is applied.

FIG. 11 is illustrative of operation of the data recorder 200 when it reproduces data in a reverse mode. In FIG. 11, a desired reproduction starting point is searched for in a preroll mode. The synchronizing operation is started from a point where the preroll mode has been effected prior to the reproduction starting point, and a first reproduction mode (FWD1) is carried out from the reproduction starting point. When the first reproduction mode (FWD1) is finished, the data recorder 200 enters a stop mode. If data are to be reproduced in a reverse mode at this time, then the reproduced data written in the DRAM 107 are read in an order opposite to the order in which they have been recorded, and the CPU 8 processes time code data in a reverse order.

Thereafter, a desired reproduction starting point preceding the first reproduction mode (FWD1) is searched for in a preroll mode, and the synchronizing operation is started from a point where the preroll mode has been effected prior to the reproduction starting point. A second reproduction mode (FWD1) is carried out from the reproduction starting point. When the second reproduction mode (FWD2) is finished, the data recorder 200 enters a stop mode. The above process is repeated to reproduce data in a third reproduction mode (FWD3) and so on. The reverse mode is carried out in the manner described above.

In the methods of recording and reproducing and apparatus for recording and reproducing time codes according to the present invention, the 70-byte history area in the header information is used to keep history information which represents blocks of data each recorded successively from the start to end of each recording event. Using such history information, any recorded data can be searched for quickly by indicating time.

Specifically, the present invention is typically applied to a system for recording data observed by an artificial satellite. In such a system, one recording event is carried out at 60 Mbps for 15 to 20 minutes, and about six recording events take place a day. In the system, about 10~15 blocks of data are recorded in a large-size tape cassette. It is requested to search for such recorded data using time codes described above.

As shown in FIGS. 12A through 12D, 60 bytes out of the 70 bytes of the history area are used to record a track set ID (3 bytes) and a time code (3 bytes) as position information of a start of each of the blocks. Using the 60 bytes allows ten sets of recording information composed of time and position information to be recorded, forming a history of the recorded information. A unit of up to 2 seconds can be recorded using 3 bytes for time codes.

In this manner, a history area of recorded information including time data (time codes) of starts of successively recorded input signals and position information (track set IDs) on the recording medium is provided on a data format (header). To update the history area, as shown in FIG. 4, the data input 110 supplies reproduced data to the bus line 119 through the reproduced header FIFO memory 129 for extracting header information from reproduced data.

At the time data starts being recorded, a preceding track set is reproduced during synchronizing information prior to the recording operation. Header information of the track set is then extracted by the FIFO memory 129, and supplied through the bus line 119 to the CPU 8. Based on the history of the extracted old recorded information, a new history is generated, and inserted into header information to be recorded.

The data of the history are successively recorded in FIFO order as shown in FIGS. 12A, 12B, 12C. When more than ten sets of data are introduced, the oldest set of data is removed as shown in FIG. 12D, so that latest ten sets of data are recorded at all times. If desired data are searched for from the end of the recorded data, then the data of the history recorded at the end block are reproduced to obtain position information of the tape, and it is predicted which block contains a desired time for thereby quickly searching for the desired data.

When an optional time (time code) is indicated by the data analyzer, the data of the history of the recorded information are reproduced, and the indicated time is converted into a track set ID to search for the corresponding data.

To search for data using an indicated time code, usually, two or more track sets are reproduced at the position, and the difference (ΔTC) between the time codes of the track sets and the difference (ΔID) between track set IDS of the track sets are calculated from the header information of the reproduced track sets. From these two differences, and the time codes and the track set IDs at those positions, a track set ID is calculated which corresponds to the indicated time code, and the calculated track set ID is searched for.

If the position of the track set ID calculated from the time code largely exceeds the end of the tape, then the tape is played back at a position divided according to a ratio at which the time code largely exceeds the end of the tape or at a central position of the tape, the history of the recorded information is read at that position, and a track set ID corresponding to the indicated time code is corrected based on the read history of the recorded information and searched for.

If a recording end point on the tape is detected based on whether there are ID data recorded in a control track, for example, while the indicated time code is being searched for, then the tape is played back from a header preceding the recording end point, the history of the recorded information in the header information is read, and a track set ID corresponding to the indicated time code is corrected based on the read history of the recorded information and searched for. The position of the track set ID corresponding to the indicated time can thus be searched for using the data of the history of the recorded information.

The first time a tape to be recorded and reproduced is loaded, the data of the history of the recorded information may successively be reproduced in a normal playback or searching mode, and, using the reproduced data, an association table of all time codes and track set IDs of the tape may be produced in a memory in the CPU 120. With the table thus produced, the searching mode can be carried out at a higher speed using the data of the table until the tape is ejected.

Since the history of recorded information including time data of the starts of recorded blocks and position information thereof on the recording medium is provided in a given data format, data can be searched for at a high speed using time codes when they are reproduced.

In the above embodiment, the recording rate is uniform on one tape, and hence the history of recorded information is composed of time data of the starts of recorded blocks and position information thereof. However, if time data of the ends of recorded blocks and position information thereof are recorded as pairs, then the methods and apparatus according to the present invention can handle different recording rates of the blocks.

In the above apparatus, the time codes may be recorded in and reproduced from areas other than the header area described above. For example, in a digital tape recorder according to standards (X3.175-1990) for an ID-1 format by ANSI, the data area of accessory information in a preamble in each track is of 54 bits, allowing 24 bytes of accessory information (AUX data) to be used in 1 track set. Therefore, the above detailed time codes can be recorded in and reproduced from the data area.

With such an arrangement, the control CPU 120 is bidirectionally connected to the data recorder through an accessory information input/output unit 125. Since the time codes are recorded and reproduced separately from the data in the data area, the frequency divider 16 shown in FIG. 9 divides the frequency into a $1/144{,}432$ frequency. In this fashion, the detailed time codes can be recorded in and reproduced from the data area of accessory information in a preamble in every 4 tracks.

A copying function of the interface device 100 will be described below.

The reproduced data from the data recorder 200 are supplied through the data input 110, the input FIFO memory 111, and the bus switcher 106 to the DRAM 107.

The input/output unit 118 is supplied with ID data (data indicative of absolute addresses of a tape recorded in the control track) of the control track reproduced by the data recorder 200. The accessory information input/output unit 125 is supplied with accessory information (AUX data) reproduced by the data recorder 200. The supplied ID data and accessory information (AUX data) are supplied to the CPU 120 through the I/O port 117 and the bus line 119.

Figure 13:
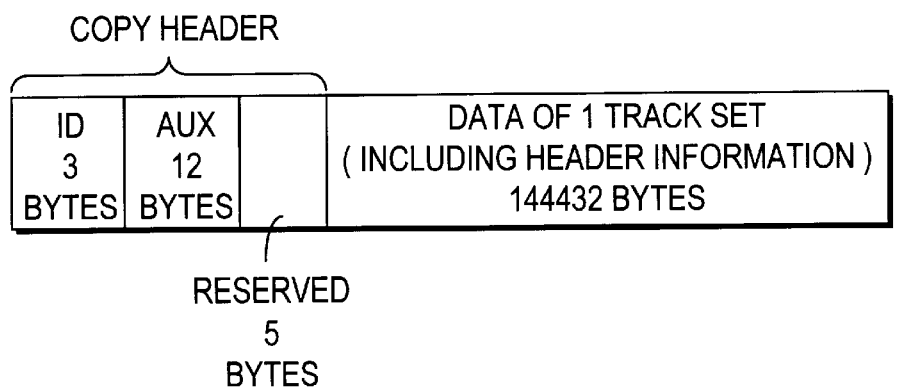
FIG. 13 is a diagram illustrative of a copying function of the data recorder to which the present invention is applied.

Based on the supplied ID data and accessory information (AUX data), the CPU 120 generates a copy header composed of a total of 20 bytes, which, as shown in FIG. 13, include 3 bytes of ID data, 12 bytes of accessory information (AUX data), and 5 bytes of reserved data successively arranged from the beginning of the data. The copy header is positioned at the beginning of the data in each unit of 144,432 bytes of data which are recorded and reproduced. The copy header is generated only when the copying function is performed.

When 144,432 bytes of data can be outputted from the DRAM 107, the copy header generated by the CPU 120 is outputted to the variable-rate data output (parallel) 113 through the output header FIFO memory 124 or to the variable-rate data output (serial) 114 through the serial-parallel converter 104.

Following the outputting of the copy header, 144,432 bytes of data (including time code data as described later on, which however are not processed, but handled as simple data when the copying operation is performed) from the DRAM 107 are supplied to the variable-rate data output (parallel) 113 through the variable-rate input FIFO memory 112 or to the variable-rate data output (serial) 114 through the serial-parallel converter 104.

The copy header and the following 144,432 bytes of data are combined with each other and sent to the data recorder.

While the copying function is being performed by the interface device 100, in order to add a copy header to data, the transfer rate for outputting data from the DRAM 107 to the variable-rate data output (parallel) 113 or the variable-rate data output (serial) 114 is made higher than the rate of the reproduced data from the data recorder 200 by about 0.05% corresponding to the added copy header.

Operation of a copying data recorder will be described. The copying data recorder is of the same structure as the reproducing data recorder, and will be described below with reference to FIG. 4.

When the copying function is performed, since it is already known that a copy header is positioned in 20 bytes at the beginning of the input data supplied to the interface device 100, the data of 20 bytes at the beginning of the input data from the variable-rate data input (parallel) 101 or the variable-rate data input (serial) 103 are introduced as a copy header through the input header FIFO memory 122 into the CPU 120.

144,432 bytes of data inputted following the copy header are written through the variable-rate input FIFO memory 105 and the bus switcher 106 into the DRAM 107. The written data are buffered for a certain period of time by the DRAM 107, and thereafter read therefrom and sent through the recorder output FIFO memory 108 and the data output 109 to the data recorder, in which the data are recorded on a tape. In this manner, the data are copied.

ID data of 3 bytes in the copy header introduced into the CPU 120 are delayed for the same period of time as the data are buffered by the DRAM 107, and thereafter sent through the I/O port 117 and the input/output unit 118 to the data recorder. In the data recorder, the supplied ID data are loaded into an ID data generator (not shown), which equalizes the ID data of the destination tape with the ID data of the source tape. In this manner, the copying of the ID data is achieved.

Accessory information (AUX data) of 12 bytes in the copy header introduced into the CPU 120 are delayed for the same period of time as the data are buffered by the DRAM 107, and thereafter sent through the I/O port 117 and the accessory information input/output unit 125 to the data recorder. In the data recorder, the necessary accessory information is recorded in a given recording region on the tape. In this manner, the copying of the Accessory information (AUX data) is achieved.

According to the copying function of the interface device 100, as described above, data and accessory information (AUX data) can efficiently be copied through a single transmission path which interconnects either the variable-rate data output (parallel) 113 of the source and the variable-rate data input (parallel) 101 of the destination or the variable-rate data output (serial) 114 and the variable-rate data input (serial) 103.

In the copying operation, time codes are recorded and reproduced based on time code data that are generated according to the present invention as described above. Therefore, the time codes will not be varied with respect to the data even if the copying operation is repeated.

According to the present invention, the supplied time code is multiplied to generate detailed time data, the time data are latched at a given time in the input signal, the latched time data are converted into a given data format, and the converted time data are recorded in the same transmission path as the input signal. In this manner, the correct time data can be recorded in the same transmission path as the input signal, and the time of recorded individual data can accurately be determined.

Further according to the present invention, the differences between successively reproduced time data and reproduced time intervals are measured, a reproduced clock signal is controlled based on the ratio between the measured differences and time intervals, the time data are preset in the counter, and the controlled reproduced clock signal is supplied to the counter to produce the count of the counter as a reproduced time code. In this manner, time codes representing times at which an input signal is recorded at an optional rate can successively be reproduced.

I claim:

1. A method of recording a time code, comprising the steps of:
   multiplying a supplied time code to produce a product, thereby generating detailed time data;
   latching the detailed time data at a given time in a data input signal;
   converting the latched time data into converted time data having a given data format; and
   recording the converted time data in a same transmission path as the data input signal.

2. A method according to claim 1, wherein said detailed time data include in a portion thereof information representing divisions of a prescribed carrier signal of the supplied time code.

3. A method according to claim 1, wherein said given data format includes a history of recorded information including the time data at a beginning of the input signal which is successively recorded and position information thereof on a recording medium.

4. A method of reproducing a time code, comprising the steps of:
   multiplying a supplied time code to produce a product, thereby generating detailed time data;
   latching the detailed time data at a given time in a data input signal;
   converting the latched time data into converted time data having a given data format;
   reproducing the converted time data in a same transmission path as the data input signal;
   measuring a time ratio between recording and reproducing time data;
   controlling a reproduced clock signal according to the ratio;
   presetting the time data in a counter; and
   supplying the controlled reproduced clock signal to said counter to produce a count of the counter as a reproduced time code.

5. A method according to claim 4, wherein said detailed time data include in a portion thereof information representing divisions of a prescribed carrier signal of the supplied time code, and a carrier signal of the reproduced time code is generated using said information representing divisions.

6. A method according to claim 4, wherein said given data format includes a history of recorded information including the time data at a beginning of the input signal which is successively recorded and position information thereof on a recording medium, and a search is controlled using the history when the time code is reproduced.

7. An apparatus for recording a time code, comprising;
   means for multiplying a supplied time code to produce a product, thereby generating detailed time data;
   means for latching the detailed time data at a given time in a data input signal;
   means for converting the latched time data into converted time data having a given data format; and
   means for recording the converted time data in a same transmission path as the path as the data input signal.

8. An apparatus according to claim 7, further comprising means for detecting information representing divisions of a prescribed carrier signal of the supplied time code, said information being included in a portion of said detailed time data.

9. An apparatus according to claim 7, further comprising means for producing a history of recorded information including the time data at a beginning of the input signal which is successively recorded and position information thereof on a recording medium, and wherein said history is included in said given data format.

10. An apparatus for reproducing a time code, comprising:
    means for multiplying a supplied time code to produce a product, thereby generating detailed time data;
    means for latching the detailed time data at a given time in a data input signal;
    means for converting the latched time data into converted time data having a given data format;
    means for reproducing the converted time data in the same transmission path as the data input signal;
    means for measuring a time ratio between recording and reproducing time data; and controlling a reproduced clock signal according to the ratio;

wherein the time data are preset in a counter, and the controlled reproduced clock signal is supplied to said counter to produce a count of the counter as a reproduced time code.

11. An apparatus according to claim 10, wherein said detailed time data include in a portion thereof information representing divisions of a prescribed carrier signal of the supplied time code, and means for generating a carrier signal of the reproduced time code is controlled using said information representing divisions.

12. An apparatus according to claim 10, wherein said given data format includes a history of recorded information including the time data at a beginning of the input signal which is successively recorded and position information thereof on a recording medium, and searching means is controlled using the history when the time code is reproduced.

* * * * *